TRIGONOMETRIC FUNCTION GENERATOR

Filed June 26, 1959

Inventors:
Thom R. Greene,
Donald M. Merz,
by Francis K. Doyle
Their Attorney.

United States Patent Office 3,009,638

Patented Nov. 21, 1961

3,009,638

TRIGONOMETRIC FUNCTION GENERATOR

Donald M. Merz, Schenectady, and Thom R. Greene, Troy, N.Y., assignors to General Electric Company, a corporation of New York Filed June 26, 1959, Ser. No. 823,030
15 Claims. (Cl. 235—152)

This invention relates to function generators and more particularly to trigonometric function generators of the type which provide sine and cosine functions for incremental digital computers.

The task of accurately providing trigonometric functions in real time for electronic digital computers with a reasonable expenditure of machine capacity has presented a difficult problem. The internal digital generation of sines and cosines normally requires an undesirably large percentage of computer machine capacity, while external analogue generation of these functions necessitates a significant increase in the amount of additional analogue equipment which must be employed with the digital computer.

One common method of generation is the series method used in general purpose digital computers. The series method is also used in connection with incremental digital computers. By this method, sine and cosines may both be obtained over a range of approximately 60° with the use of five algorithms. While the theoretical accuracy of this solution is of the order of one in a thousand or better, the practical accuracy is considerably less. When the algorithms are scaled so that each intermediate quantity can keep up while the angle is changing, there is a loss. Moreover, the method is costly in that it may use up to 5% of machine capacity per angle with marginal accuracy over a limited range.

Another method exploited in both incremental and digital differential analyzer computers employs the solution for the differential equation $dy=xd\theta$ and $dx=-yd\theta$. This method is subject to drift, however, and requires a fixed angle change increment of extremely small magnitude for accuracy. When the incremental change is made small enough to yield good accuracy, prohibitive operating time is required and it is often not possible for this method of solution to keep up with the changing angular input at its normal time rate of change.

A third method of operation requires that all angles be represented at some point in the system by shaft rotation. Then each shaft drives a code wheel which yields a parallel digital representation of the sine or cosine of the particular angle. This technique necessitates additional analogue apparatus for use with the digital computer.

Accordingly, therefore, a primary object of this invention is to provide an improved trigonometric function generator for incremental digital computers which provides rapid and continuous solution for the sine or cosine of an angle changed by incremental inputs.

Another object of this invention is to provide a trigonometric function generator for incremental digital computers and the like which solves for the sine or cosine of an angle changed by incremental inputs with accuracy of one part in a thousand.

Another object of this invention is to provide trigonometric function generator circuitry for incremental digital computers for the purpose of deriving the sine and cosine of a plurality of angles each of which is changed by various incremental inputs.

Still another object of this invention is to provide a trigonometric function generator which solves for the sine and cosine of an angle changed by incremental inputs by utilizing mechanization of trigonometric identities in real time for angular slewing rates up to at least a radian and a half per second and at an incremental frequency which permits the use of increments small enough to yield a substantially accurate sine and cosine.

A further object of this invention is to provide a trigonometric function generator which provides rapid and continuous solution for the sine or cosine of an angle changed by incremental inputs, and in which extensive use of additional analogue computing stages is rendered unnecessary.

A still further object of the invention is to teach improved function generator circuitry for providing rapid and continuous solution for the sines or cosines in which solution drift is substantially minimized.

In carrying the present invention in one form, there is provided a pair of memory devices or tracks, the first of which contains the sine and cosine of the angle just solved, immediately previous to a newly received angular input increment. The second device or track contains the cosine and sine of the same angle. The sine in the first memory device is read twice with a definite difference in relative significance or effective reading time. This value comprises the number of bits equal to the power of the system radix (the binary two is preferred) in the second most significant term in an expansion for the cosine of the incremental change which consists of the system radix raised to descending powers and summed algebraically. In this process, the less significant of the sine readings is subtracted from the more significant reading. The cosine of the prior angle is read from the second memory device with a relative significance which is less than the aforementioned more significant sine by a definite number of bits. This is the number of bits equal to the power of the system radix in the most significant term of an expansion for the sine of the incremental change which consists of the system radix raised to descending powers and summed algebraically. The incremental angular changes in radians are denominated as powers of the system radix and therefore the most significant term of the sine of the incremental change for small angles is also equal to the angular change in radians.

The cosine which is thus read is combined with the above mentioned subtraction in an adder for the purpose of deriving the sine of the prior angle plus the incremental angular change. The new sine is then returned to both memory devices in place of the old and becomes the old sine for the next incremental calculation.

At this time, the cosine in the first memory device is read twice with a difference in relative significance of the number of bits equal to the difference in significance in the sine reading from the memory device referred to earlier in the specification. The less significant of the cosine readings is at this time subtracted from the more significant reading. The sine of the prior angle is now read from the second memory device with a relative significance which is less than the more significant cosine by the number of bits equal to the power of the system radix in the most significant term in the sine expansion as explained immediately above. The sine which is read in this manner is combined with the last mentioned subtraction within an adder. The sine is complemented by this means so that a difference equal to the cosine of the prior angle plus the incremental angle results. This new cosine value is then returned to both memory devices to replace the previous cosine value.

In practicing the invention, the same equipment is employed for obtaining both the new sine and the new cosine on a time-sharing basis, the major differences being essentially sign changes and the placement of the new functions in the proper time-locations in the memory devices. Depending upon the capacity of the memory equipment, the sines and cosines of a number of different incrementally changing angles may be repetitively computed by the inventive system of a time-shared basis.

Due to the relative simplicity of the inventive circuitry, the sine and cosine of a new angle after an incremental increase is solved quite rapidly with a relatively few bit times more than the actual reading of the old values required. Moreover, even though the angular incremental changes are small enough to render accurate solutions, there is ample time available to permit substantially continuous solution of the functions of a number of changing angles without tying up the arithmetic element of the computer.

The invention will be more fully understood by reference to the following drawing wherein.

Figures 1, 2:
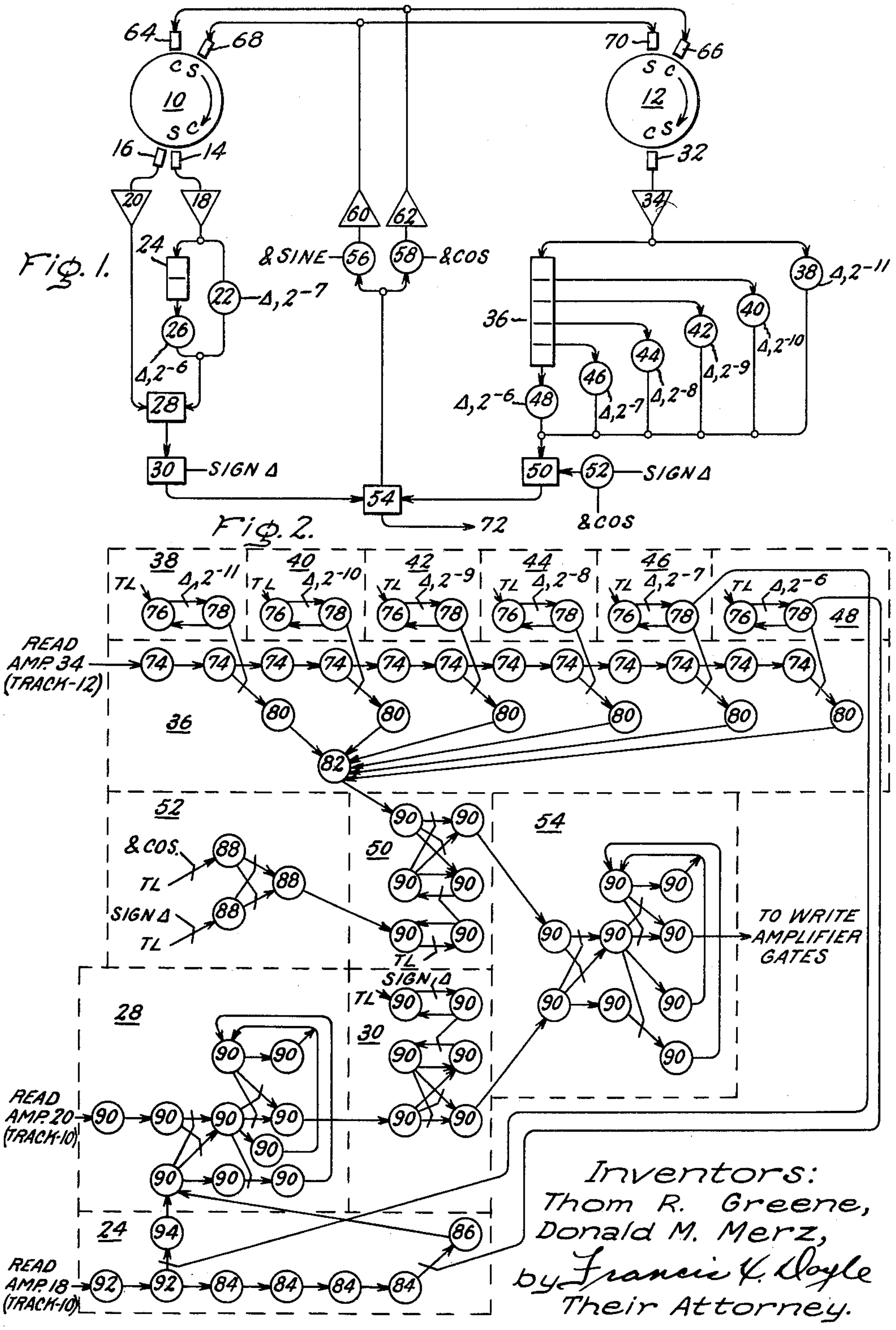
FIGURE 1 is a block diagram of an embodiment of the invention.
FIGURE 2 is a magnetic core logical diagram illustrating one manner of implementing certain portions of the FIGURE 1 apparatus.

Referring now to FIGURE 1, the magnetic drum storage feature of the invention will be seen to include two tracks, 10 and 12, which are used for storing serial binary information. Each of the tracks contain alternate word representations of the sine and cosine of an angle and the tracks are displaced relative to each other so that the sine on one track appears at the same place as the cosine on the other track, and vice versa. These functions are represented in FIGURE 1 by the reference characters S and C, with S standing for sine and C standing for cosine. The description of the invention will assume the binary radix two, although it will be understood that any other desired radix may be used.

Two read heads 14 and 16 are associated with track 10, and these read heads are spaced 15 bits apart. As the track 10 rotates clockwise the sine (or cosine) first passes beneath head 14 and then beneath head 16, so that the function read from head 14 has a relative significance of $2^{-15}$ as compared with the function read from track 16 in a serial binary computer. The signals from read heads 14 and 16 are amplified by means of read amplifiers 18 and 20 respectively. The amplifier 18 is connected to drive a delay line 24 which provides a delay of two binary bits. The output of delay line 24 will thus have a relative significance of $2^{-13}$ as compared with the read head 16. The amplifier 18 also drives "and" gate 22. Gate 22 receives a second input, as shown, as an instruction, when the angular incremental input Δ to the computer is $2^{-7}$ radians. The "and" gate 26 receives its input from the output end of delay line 24, and also receives an instruction input, as shown, when the angular incremental input to the computer is $2^{-6}$ radians. Since only one of the aforementioned instructions are received at any one time, the outputs of the two "and" gates 22 and 26 are tied together and subtracted from the output of the amplifier 20 within a subtractor 28. The subtractor 28 feeds a complementer 30 which produces the complement of the difference when the sign of the incremental angular change Δ is negative. This instruction is given to the complementer 30 as a computer input regarding the sign of the incremental input. A negative sign indicates that the angle is decreasing by the incremental amount.

In the right hand portion of FIGURE 1, a read head 32 is associated with the track 12 and is arranged relative to this track to read the cosine while the read heads of track 10 are reading the sine, and vice versa. The read head 32 is displaced counterclockwise around track 12 by 11 bits with respect to the placement of the read head 16 on the opposite function. As a result, the function on track 12 is read with a relative significance of $2^{-11}$, read head 16 being taken as standard or $2_0$. The read head 32 supplies an input for a read amplifier 34 which drives a delay line 36 and an "and" gate 38.

The delay line 36 has a total delay of 5 bits with branched outputs at one bit intervals so that delays from zero to 5 bits are available. Delayed outputs of one through 5 bits are applied respectively as one input to each of the "and" gates 40, 42, 44, 46, and 48. The other inputs to each of these "and" gates, which must also be present for a delayed signal to pass, are computer input instructions for incremental angular changes of $2^{-10}$, $2^{-9}$, $2^{-8}$, $2^{-7}$, and $2^{-6}$ radians respectively. "And" gate 38 receives its other input as an input instruction for an incremental change of $2^{-11}$ radians and after receiving such instruction, passes the function from track 12 with a relative significance of $2^{-11}$ as compared with read head 16 on track 10. With any of the above delays inserted subsequent to the amplifier 34, a corresponding increase in the relative significance of the delayed output is introduced.

Each of the gates 38, 40, 42, 44, 46, and 48 in FIGURE 1 is arranged to drive a complementer 50. It will be appreciated that only one of the gates is operated by an incremental angular change Δ at any one time. The unit 50 complements the signal it receives whenever the incremental angular change Δ is negative, or when the read head 16 is reading the cosine. When this occurs, timing circuitry causes the instruction, "& cos" to appear at a gate 52 to operate the complementer.

The gate 52 is an "or-but-not-and" gate which operates complementer 50 if it receives either one of the aforementioned signals, but not if it receives both of them. When the complementer 50 is not "operated" it functions to pass the serial signal uncomplemented.

The signals from complementer 50 and complementer 30 are combined in adder 54 to provide the new sine or cosine output 72 to the incremental digital computer with which the present invention is intended to operate. For example, the trigonometric function generator of this invention may be utilized with the Variable Increment Computer described and claimed in copending patent application, Serial No. 809,643, filed April 29, 1959, in the names of Edward H. Cabaniss and John S. Prince, and assigned to the same assignee as the present invention. The output of adder 54 is also fed to "and" gates 56 and 58 for reinsertion in the memory in place of the old sine or cosine value.

Time instruction inputs "& sin" and "& cos" supply the remaining inputs for gates 56 and 58, depending upon which is being read from the read head 16 and depending also upon whether the sine or cosine is being solved for. It will be evident that only one of these inputs appears at one time. The "and" gate 56 supplies a write amplifier 60 which drives a write head 68 positooned on track 10 and a write head 70 positioned on track 12. The "and" gate 58 supplies a write amplifier 62 which drives a write head 64 on track 10 and a write head 66 on track 12.

Since sine and cosine values alternate around the tracks, sine write heads 68 and 70 are displaced in reverse order from cosine write heads 64 and 66 by the distance between the start of a sine word and start of a cosine word. A large number of sines and cosines may be stored around the tracks.

The storage device which may be employed as a part of the inventive combination is of course not restricted to magnetic drum type storage. Rather, any convenient type of storage may be used such as recirculating acoustic memories, magnetic shift registers, or the like. Furthermore, with slight increase in equipment, it is possible for the invention to solve for the sine and cosine simultaneously rather than sequentially, with duplication in the above described arithmetic elements. It is also contemplated that with a sufficient number of read heads or the like placed on one track, a single memory device may be used in practicing the invention. It will be appreciated that delay lines may also be replaced by read heads spaced around the track.

The incremental inputs $\Delta,2^{-6}$ through $\Delta,2^{-11}$ are provided in normal conversion techniques, the increments being expressed as single binary digits for the number of radians which equal the increment. In case of more than one binary digit, the input may be handled sequentially. If the angle is internally generated in an incremental digital computer, the increments may be the output of some algorithm. It may be convenient to express such increments by means of a six digit code, in which the scaling forms a unit of angular increment$=2^{-11}$ radians. Then two units$=2^{-10}$ radians, four units$=2^{-9}$ radians, and so forth.

Referring now to FIGURE 2 which shows magnetic means for instrumenting the logic equivalent to the arithmetic elements shown in FIGURE 1, the signal from read amplifier 34 of FIGURE 1 drives a number of serially connected toroidal magnetic cores 74 which form an information delay line or shifting register. The magnetic cores 74 are each characterized by a substantially rectangular hysteresis loop. For the sake of clarity the winding and diode connections are not shown. However, such details will be understood by those skilled in the computer art for the logical presentation. It is understood, for example, that a periodically pulsed shift bus interlinks the cores 74 in order to move the information received from read amplifier 34 along the line of cores to the right. Examples of preferred core logic circuitry which may be used in this invention are shown and described in copending patent application, Serial No. 666,003, now Patent No. 2,932,815, for Magnetic Core Logic Units, filed June 17, 1957, in the names of Edward H. Cabaniss and Clarence P. Christensen, and assigned to the same assignee as the present invention.

of one binary bit per two cores of the delay line, so the respective outputs which may be supplied to subtractor 28 are two binary bits apart, in the same manner as the signals through gates 22 and 26 of FIGURE 1. The minuend input for the subtractor 28 in FIGURE 2 is obtained from read amplifier 20 of FIGURE 1.

The logical operation of units such as the subtractor 28, complementers 30 and 50, adder 54, and the gate 52, which employs magnetic cores 90 is well known to those skilled in the art, and hence will not be exhaustively treated. The operation of similar circuits are described in the aforementioned copending patent application, Serial No. 809,643. It will be appreciated that other units may be employed to perform the inventive logic. For example, conventional diode and pulse amplifier circuitry could be used for this purpose.

In operation, the apparatus illustrated in FIGURE 1 solves the trigonometric identities, $$\sin (a+b)=\sin a \cos b+\cos a \sin b, \text{ and}$$
$$\cos (a+b)=\cos a \cos b-\sin a \sin b$$

or more particularly, $$\sin \theta_i=\sin \theta_{i-1}\ K\Delta+\cos \theta_{i-1}\ K'\Delta, \text{ and}$$
$$\cos \theta_i=\cos \theta_{i-1}\ K\Delta-\sin \theta_{i-1}\ K'\Delta,$$

where $\theta_{i-1}$ is an angle just before an incremental increase or decrease, Δ, and KΔ and K′Δ are the values selected for utilization for sin Δ and cos Δ, respectively. Sin $\theta_i$ and cos $\theta_i$ are the values sought for the total angle. The selected values for KΔ and K′Δ are set out in tabular form in Table I.

*Table I*

| Δ, radians as powers of radix | Sin Δ, in powers of radix | Cos Δ, in powers of radix | Approximation Used for Sin Δ | Approximation Used for Cos Δ | $z=pe^{j\alpha}$ | P | α, radians | α−Δ, radians |
|---|---|---|---|---|---|---|---|---|
| $2^{-11}$ | $2^{-11}-2^{-36}+\ldots$ | $2^0-2^{-23}+2^{-49}\ldots$ | $2^{-11}$ | $2^0$ | $1+2^{-11}j$ | $1+1.2\times10^{-7}$ | $2^{-11}(1-.79\times10^{-7})$ | $-.39\times10^{-10}$ |
| $2^{-10}$ | $2^{-10}-2^{-33}+\ldots$ | $2^0-2^{-21}+2^{-45}\ldots$ | $2^{-10}$ | $2^0$ | $1+2^{-10}j$ | $1+4.8\times10^{-7}$ | $2^{-10}(1-.32\times10^{-6})$ | $-.31\times10^{-9}$ |
| $2^{-9}$ | $2^{-9}-2^{-30}+\ldots$ | $2^0-2^{-19}+2^{-41}\ldots$ | $2^{-9}$ | $2^0$ | $1+2^{-9}j$ | $1+1.9\times10^{-6}$ | $2^{-9}(1-.13\times10^{-5})$ | $-.25\times10^{-8}$ |
| $2^{-8}$ | $2^{-8}-2^{-27}+\ldots$ | $2^0-2^{-17}+2^{-37}\ldots$ | $2^{-8}$ | $2^0$ | $1+2^{-8}j$ | $1+7.6\times10^{-6}$ | $2^{-8}(1-.51\times10^{-5})$ | $-.20\times10^{-7}$ |
| $2^{-7}$ | $2^{-7}-2^{-24}+\ldots$ | $2^0-2^{-15}+2^{-33}\ldots$ | $2^{-7}$ | $2^0-2^{-15}$ | $1-2^{-15}+2^{-7}j$ | $1+4\times10^{-10}$ | $2^{-7}(1+.10\times10^{-4})$ | $+.79\times10^{-7}$ |
| $2^{-6}$ | $2^{-6}-2^{-21}+\ldots$ | $2^0-2^{-13}+2^{-29}\ldots$ | $2^{-6}$ | $2^0-2^{-13}$ | $1-2^{-13}+2^{-6}j$ | $1+7.2\times10^{-9}$ | $2^{-6}(1+.41\times10^{-4})$ | $+.64\times10^{-6}$ |

The delay line in this diagram is generally designated by the numeral 36, as equivalent to delay line 36 of FIGURE 1. Gating devices 38, 40, 42, 44, 46, and 48, each receive timing impulses, TL, from the computer and incremental angular inputs $\Delta,2^{-11}$; $\Delta,2^{-10}$; $\Delta,2^{-9}$; $\Delta,2^{-8}$; $\Delta,2^{-7}$; and $\Delta,2^{-6}$; respectively. Each of the gating devices comprises a magnetic flip-flop which includes cores 76 and 78. The timing pulses energize cores 76 while the incremental inputs act to inhibit the outputs from cores 76, thus preventing cores 78 from subsequently becoming energized provided the incremental input is present. The outputs of each core 78 is connected to inhibit one of the group of one bit interval outputs provided along the delay line 36. Thus, when an incremental input Δ, is present at one of the gates, and the gate flip-flop prevented from "flipping" to the right hand position, a corresponding output of the delay line will remain uninhibited and the output will pass, via one of the cores 80, to the "or" gate core 82 to provide an input to the complementer 50.

The output from read amplifier 18 drives a plurality of serially arranged cores 92 which have an inhibited output to core 94, controlled by core 78 of gate 46. When uninhibited, this output provides the subtrahend input for subtractor 28 through the core 94. Cores 92 together with cores 84 form an information delay line or shifting register generally designated by the reference numeral 24. This register has an output inhibited from core 78 of gating device 48. When uninhibited, this output passes through core 86 and supplies the subtrahend for subtractor 28. It will be evident that there is a delay The old values (sub *i*—1) of sine and cosine are read from tracks 10 and 12, respectively. As earlier mentioned, the two read heads 14 and 16 with associated amplifiers on track 10 are spaced 15 bits apart. The quantity sin $\theta_{i-1}$ is read twice with a relative significance of the factor $2^{-15}$ with the first head 14 being of lesser significance. The outputs of amplifiers 20 and 18 respectively are thus sin $\theta_{i-1}$ and $2^{-15}$ sin $\theta_{i-1}$. These two quantities are combined subtractively in subtractor 28, the resultant being sin $\theta_{i-1}(1-2^{-15})$. The quantity $(1-2^{-15})$ approximates the cosine of Δ where $\Delta=2^{-7}$ radians, which comprises the input quantity necessary for the signal from the read head 14 to proceed directly to the subtractor 28. The above multiplication will thus be seen to approximately equal sin $\theta_{i-1}$ cos Δ, one of the terms of the identity, with $\Delta=2^{-7}$ radians.

Alternately, by providing a secondary path for the signal from read head 14 through a two bit delay 24, the significance of the factor from read head 14 becomes $2^{-13}$, provided that there is an input signal of $\Delta,2^{-6}$ radians applied gate 26. Upon combination in subtractor 28 sin $\theta_{i-1}(1-2^{-13})$ is obtained. The quantity $(1-2^{-13})$ is approximately equal to the cosine of $2^{-6}$ radians, so the multiplication is again approximately equal to sin $\theta_{i-1}$ cos Δ. By inhibiting both paths from read head 14, the output of subtractor 28 becomes sin $\theta_{i-1}(1)$. For values of Δ less than $2^{-7}$, the cosine is given the approximate value of $2^0$ or (1), see Table I.

Simultaneously with the above sequence, the cosine (read from track 12) is sent through a variable delay which may vary between the limits of $2^0$ and $2^5$. The particular value of delay is determined by the increment Δ input which controls the various gating devices used to gate the portions or to bypass the delay line 36. An additional factor of $2^{-11}$ is present by virtue of the physical location of read and write heads on the track 12. The output from the variable delay thus takes the form:

$$\cos \theta_{i-1}(2^{-11}) \leftrightarrow \cos \theta_{i-1}(2^{-6})$$

for $$\Delta = 2^{-11} \leftrightarrow 2^{-6}$$

For the case of a zero increment, none of the abovementioned paths are open and the output is identically zero. The quantities $\sin \theta_{i-1}K\Delta$ and $\cos \theta_{i-1}K'\Delta$ are combined in adder 54 to develop a new value for $\sin \theta_i$. This quantity is gated through the write amplifier 60 and is written on both tracks 10 and 12.

In solving for the new cosine, the operation is quite similar to that described immediately above. The principal differences are that $\cos \theta_{i-1}$ is read from track 10 and $\sin \theta_{i-1}$ is read from track 12. When the increment is positive, the complementer 50 causes adder 54 to operate as a subtractor. Moreover, the "& cos" control signals are turned on while the "& sin" signals are turned off, in order to operate write heads 64 and 66 instead of 68 and 70, in addition to operating complementer 50.

The sines and cosines of the various angles alternate in position around each of the tracks. For the case of zero increments of Δ, both sine and cosine values are returned to the drum unaltered. Increments of angles must be developed externally to the mechanization and this is handled in the standard incremental computer as an input from an analog to digital converter.

It should be understood that full word multiplications are avoided in the present invention. The solution for the function takes but little longer than the reading time for the old functions plus the time necessary for the read words to pass through a pair of cascaded serial adders. The solution for the function of the new angle plus the incremental angle is primarily dependent in time upon the time interval required to read the old function with the various read heads. With the present device, slewing rates of 90° per second are possible with a resolution of ½ mil. Moreover, the equipment required is small and uncomplex as compared with the usual computer arithmetic units. In the present specification, it has been assumed that the incremental computer or differential analyzer with which the invention is used has access to a magnetic drum memory with a number of storage tracks thereon which may be employed with the present invention. Where the computer uses another type of memory unit, such unit may be substituted for the drum type by maintaining the various interrelations between the readings, and such use would be deemed to fall within the purview of the present invention.

Continuing now with the detailed description, and referring to Table I for each of the selected angular incremental inputs Δ, a corresponding series is shown for the sine and cosine of the incremental angle. This value is also expressed in powers of the system radix, which in this case is the binary two. From the foregoing discussion of the operation of the present invention, it will be recalled that only the first term of the sine expansion is employed for the sine of Δ. In like manner, only the first term is employed in the apparatus for the cosine of Δ for the angular increments $\Delta 2^{-8}$ through $2^{-11}$. The first two terms are employed for angular increments of $2^{-7}$ or greater.

It may be noted in Table I that the expansions for sine and cosine can be denominated as expansions consisting of the system radix raised to descending powers and summed algebraically or alternatively as the system radix raised to ascending negative powers and summed algebraically. The approximation employed for the sine is in general equal to the angular increment itself in radians. Although more terms may be used for either the sine or cosine, a general loss of computing time results for each such additional term employed.

The table also shows the approximations selected and combined into a complex number or vector, $p/\alpha = z = p \cos \alpha + jp \sin \alpha$ corresponding to each Δ. The real and imaginary functions of this equation are then taken as the sine and cosine of the fictitious angle α. The amplitude $p$, of the function and the effective angle α, can be taken as indications of goodness of fit of the approximations for the sine and cosine for Δ. In other words, it is desired that $p=1$ and $\alpha=\Delta$.

Let us define a process for generating successive values $u_1, u_2, u_3, \ldots$ and $v_1, v_2, v_3, \ldots$ etc., by the rules $$(1) \qquad u_n = u_{n-1}(p \cos \alpha)_n - v_{n-1}(p \sin \alpha)_n$$

$$(2) \qquad v_n = v_{n-1}(p \cos \alpha)_n + u_{n-1}(p \sin \alpha)_n$$

Here the $n$th Δ selects values $(p \cos \alpha)_n$ and $(p \sin \alpha)_n$. If the previous values, $u_{n-1}$ and $v_{n-1}$, are available the multiplicationss can be executed to determine $u_n$ and $v_n$. In this manner, the sequence can be constructed up to any point from given initial values $u_0$ and $v_0$. To expedite the explanation, it is convenient to combine Equations 1 and 2 into a single equivalent complex equation.

Define the complex variable $$(3) \qquad \omega_n = u_n + jv_n$$

Then let $$(4) \qquad \omega_n = p_n e_n^{j\alpha} \omega_{n-1}$$

Equating real parts of (4) yields Equation 1. Equating imaginary parts yields Equation 2.

Assume that a sequence of driving increments $\Delta\theta_1, \Delta\theta_2, \Delta\theta_3, \ldots \Delta\theta_n$ is prescribed. Then $\theta_n = \theta_0 + \Delta\theta_1 \ldots + \Delta\theta_n$. The associated sequence $p_1 \cos \alpha_1$, $p_1 \sin \alpha_1$; $p_2 \cos \alpha_2$, $p_2 \sin \alpha_2$; ... will also be determined. Or the equivalent sequence $p_1e^{j\alpha_1}$, $p_2e^{j\alpha_1}$, $p_2e^{j\alpha_2}$, ... $p_ne^{j\alpha_n}$ is determined. Using the complex form of the recurrence Relation 4, we have $$\omega_1 = \omega_0 p_1 e^{j\alpha_1}$$

$$\omega_2 = \omega_1 p_2 e^{j\alpha_2} = \omega_0 p_1 p_2 e^{j(\alpha_1+\alpha_2)}$$

$$\cdots\cdots$$

$$(5) \qquad \omega_n = \omega_0 p_1 p_2 p_3 \ldots p_n e^{j(\alpha_1+\alpha_2+ \ldots +\alpha_n)}$$

By inspection of Table I it may be seen that any calculated $\omega_i$ is very nearly equal the corresponding Δ (that is to say $\Delta\theta_i$). Also $p_i$ is very nearly 1. Now, if $\omega_0 = e^{j\theta_0}$ and both the excess of $p_i$ over one and the error between the $\alpha_i$ and $\Delta\theta_i$ be neglected, Equation 5 becomes:

$$\omega_n = e^{j(\theta_0+\Delta\theta_1+\Delta\theta_2+ \ldots +\Delta+\theta_n)}$$

or $$\omega_n = e^{j\theta_n}$$

or $$u_n + jv_n = \cos \theta_n + j \sin \theta_n$$

This establishes that Rules 1 and 2, with approximations $p_n \cos \omega_n$, $p_n \sin \alpha_n$ for cos Δ and sin Δ tend to yield $u_n = \cos \theta_n$ and $v_n = \sin \theta_n$ to within the limits of errors to be discussed. The nature and magnitude of such errors may be analyzed as follows.

The discrepancy in arguments $\alpha_n$ and $\Delta\theta_n$ may be first examined. When an excursion is made from 0° to 90° and back to 0° at a fixed increment size, the α argument returns to its original value. Moreover, with oscillation about some particular point with a fixed increment no build up in the error in the argument is possible. The precise argument error does depend on the manner in which the angle proceeded from the starting point to the final point in question. For example, from the table the increase in argument error due to a change of $\Delta\theta = 2^{-6}$ radians is $.64 \times 10^{-6}$ radians. However, the increase in argument error due to two successive angle changes of $\Delta\theta = 2^{-7}$ is only $.16 \times 10^{-6}$ radians. If slewing from zero to 90° occurs at the maximum increment size of $2^{-6}$ radians/step, about 100 steps are required and the argument error is $.64 \times 10^{-4}$ radians.

The error in cosine at this point is then $.64\times10^{-4}$ due to the error in argument alone. The error in sine is much less at this point because the sine does not change fast near 90°. The slew to 90° at minimum speed increments, $2^{-11}$, then yields $3200\times(-0.387\times10^{-10})$ radians error in argument or $-1.3\times10^{-7}$ radians.

A limited type of drift in the effective argument of the mechanized sine and cosine will be seen to occur. However, the error depends on the path selected to the point in question. In a dynamic problem the great volume of cancellation has the effect of holding the argument error within reasonable bounds. In practicing the invention it has been discovered that this error is negligible for problems of several minutes duration.

In practicing the invention, amplitude errors can be readily corrected, since $u_n^2+v_n^2=(p_1p_2 \ldots p_n)^2$. To correct, each output is attenuated by $1/\sqrt{u_n^2+v_n^2}$ and reset. In the normal problem this is of course not necessary.

If the nature of the computer application is such that an excessive number of calculations are required, the modulus may be readily modified to correct any error. Note the table below:

*Table II*

| Δ Radians: | Modulus excess over 1 |
|---|---|
| $2^{-11}$ | $2^{-23}$ |
| $2^{-10}$ | $2^{-21}$ |
| $2^{-9}$ | $2^{-19}$ |
| $2^{-8}$ | $2^{-17}$ |
| $2^{-7}$ | $2^{-31}$ |
| $2^{-6}$ | $2^{-27}$ |

The amplitude is a product of moduli of the form $A_n=(1+2^{-h_1})\ (1+2^{-h_2}) \ldots (1+2^{-h_n})$ where the $h_i$ identifies exponents corresponding to $\Delta_i$. Since the exponents are large, it is possible to use the expression:

$$A_n=1+\sum_{i=1}^{n}2^{-h_i} \text{ or } A_n-1=\sum_{i=1}^{n}2^{-h_i}$$

The term $A_{n-1}$ can be counted exactly with a programmed counter, or an average $2^{-h_i}=2^{-23}$ may be utilized.

In this case, $A_n-1=n2^{-23}$. Using $n=2^{-9}=512$, $A_{512}$ would equal $1+2^{-14}$. To correct at the 512th step, $u_{512}$ corrected$=u_{512}(1-2^{-14})$ and likewise for $v_n$. This process then continues from corrected values for another 512 steps for reset.

There has thus been described a novel and useful apparatus for determining a substantially continuous sine or cosine function for an angle changing by incremental inputs, and with a minimal error in the result. The invention is capable of use with incremental computers, digital differential analyzers, and other equivalent types of circuitry.

What is claimed is:

1. In an incremental digital computer which has a predetermined system radix and a capability for registering incremental angular changes, an apparatus for determining the sine of the changed angle which comprises a first storage device for registering the sine and cosine of the unchanged angle, a second storage device for registering the cosine and sine of the unchanged angle, means for reading said sine from said first storage device, means for also effectively reading said sine from said first storage device earlier in time by the number of bits corresponding to the power of the second most significant term of an expansion for the cosine of said incremental angle consisting of the system radix raised to descending powers and summed to equal the cosine of said incremental angle, means for producing the difference of said read sine and said early read sine, means for reading said cosine of the unchanged angle from said second storage device early relative to the reading of said read sine by the number of bits corresponding to the power of the first term of an expansion for the sine of said incremental angle consisting of the system radix raised to descending powers, means for adding said differences and said early read cosine to produce substantially the sine of said changed angle consisting of said unchanged angle plus said incremental angle, and means for returning the new sine to said storage devices.

2. The apparatus as recited in claim 1 wherein the system radix is two.

3. The apparatus as recited in claim 1 which includes means for reading the cosine from said first storage device, means for also reading the cosine from said first storage device earlier in time by the number of bits corresponding to the power of the second most significant term of an expansion for the cosine of said incremental angle consisting of the system radix raised to descending powers and summed equaling the cosine of said incremental angle, means for producing the difference of said read cosine and said early read cosine, means for reading the sine from said second storage device early relative to the reading of said read cosine by the number of bits corresponding to the power of the first term of an expansion for the sine of said incremental angle consisting of the system radix raised to descending powers, means for subtracting said early read sine from said difference to produce substantially the cosine of said changed angle consisting of said unchanged angle plus said storage devices.

4. The apparatus as recited in claim 3 wherein the system radix is two.

5. In an incremental digital computer having a predetermined system radix and a capability for registering incremental angular changes, an apparatus for determining the cosine of an angle which comprises a first storage device for registering the sine and cosine of a previously solved angle, a second storage device for registering the cosine and sine of said previously solved angle, means for reading the cosine from said first storage device, means for also reading the cosine from said first storage device earlier in time by the number of bits corresponding to the second most significant term of an expansion for the cosine of said incremental angle consisting of the system radix raised to descending powers and summed equaling the cosine of said incremental angle, means for producing the difference of said read cosine and said early read cosine, means for reading the sine from said second storage device early relative to the reading of said read cosine by the number of bits corresponding to the power of the first term of an expansion for the sine of said incremental angle consisting of the system radix raised to descending powers, means for subtracting said early read sine from said difference to produce substantially the cosine of the angle consisting of said previously solved angle plus said incremental angle and means for returning the new cosine to said storage devices.

6. The apparatus as recited in claim 5 wherein the system radix is two.

7. In a digital computer having a predetermined system radix, apparatus for recalculating the sine of an angle changed in accordance with a small incremental angle change in radians comprising, a first storage means containing the prior calculated sine of the unchanged angle, means for deriving said sine as an output from said first storage means, a second storage means containing the prior calculated cosine of the unchanged angle, means for deriving said cosine as an output from said second storage means, first switching means responsive to said incremental change for producing at least the most significant term of an expansion for the cosine of said small incremental angle consisting of one minus the system radix raised to ascending negative powers, means for producing the multiplication of the output of said first storage means with the output of said first switching means, means for producing the multiplication of the output of said second storage means with a digital representation including said incremental angle change in radians, an adder for adding said latter two multiplications and rewriting means replacing the sine in said first storage means with said latter addition.

8. The apparatus of claim 7 including switching means denominating the incremental angle change as powers of the system radix.

9. The apparatus as recited in claim 7 in which said first storage means contains the prior calculating cosine of the unchanged angle, means for deriving said cosine as an output from said first storage means, said second storage means containing the prior calculated sine of the unchanged angle, means for deriving said sine as an output from said second storage means, said first switching means being responsive to said incremental change for producing at least the most significant term of an expansion for the cosine of said small incremental angle consisting of one minus the system radix raised to ascending negative powers, means for producing the multiplication of the cosine output of said first storage means with the output of said first switching means, means for producing the multiplication of the sine output of said second storage means with a digital representation including said incremental angle change in radians, a subtractor for subtracting the latter of the two multiplications from the former, and rewriting means replacing the cosine in said first storage means with said latter subtraction.

10. The apparatus of claim 9 including means for rewriting the newly recalculated sine and cosine to each storage device on a time-shared basis.

11. The apparatus of claim 9 including switching means denominating the incremental angle change as powers of the system radix.

12. In a digital computer having a predetermined system radix, apparatus for recalculating the cosine of an angle changed in accordance with a small incremental angle change in radians comprising, a first storage means containing the prior calculated cosine of the unchanged angle, means for deriving said cosine as an output from said first storage means, a second storage means containing the prior calculated sine of the unchanged angle, means for deriving said sine as an output from said second storage means, first switching means responsive to said incremental change for producing at least the most significant term of an expansion for the cosine of said small incremental angle consisting of one minus the system radix raised to ascending negative powers, means for producing the multiplication of the cosine output of said first storage means with the output of said first switching means, means for producing the multiplication of the sine output of said second storage means with a digital representation including said incremental angle changed in radians, a subtractor for subtracting the latter of the two multiplications from the former, and rewriting means replacing the cosine in said first storage means with said latter subtraction.

13. The apparatus of claim 12 including switching means denominating the incremental angle change as powers of the system radix.

14. The apparatus of claim 3 including switching means denominating the incremental angle change as powers of the system radix.

15. The apparatus of claim 9 having attenuating means for reducing the new sine and cosine by a predetermined factor proportional to a total number of successive incremental inputs.

No references cited.